United States Patent
Lowder et al.

(10) Patent No.: US 9,977,412 B2
(45) Date of Patent: May 22, 2018

(54) ELECTRONIC CIRCUIT TO CAPTURE LOCK CONTROLLER PULSES

(71) Applicant: Sargent Manufacturing Company, New Haven, CT (US)

(72) Inventors: Scott B. Lowder, Orange, CT (US); Jon Hulse, Wethersfield, CT (US); Adam O'Day, Bristol, CT (US); Arthur Limoncelli, New Haven, CT (US); Angelo Arcaria, Colchester, CT (US)

(73) Assignee: SARGENT MANUFACTURING COMPANY, New Haven, CT (US)

( * ) Notice: Subject to any disclaimer, the term of this patent is extended or adjusted under 35 U.S.C. 154(b) by 289 days.

(21) Appl. No.: 14/768,052

(22) PCT Filed: Mar. 14, 2014

(86) PCT No.: PCT/US2014/027050
§ 371 (c)(1),
(2) Date: Aug. 14, 2015

(87) PCT Pub. No.: WO2014/152187
PCT Pub. Date: Sep. 25, 2014

(65) Prior Publication Data
US 2016/0054714 A1    Feb. 25, 2016

Related U.S. Application Data

(60) Provisional application No. 61/792,306, filed on Mar. 15, 2013.

(51) Int. Cl.
*E05B 47/00* (2006.01)
*G05B 15/02* (2006.01)
*G07C 9/00* (2006.01)

(52) U.S. Cl.
CPC .............. *G05B 15/02* (2013.01); *E05B 47/00* (2013.01); *E05B 47/0001* (2013.01); *E05B 47/0012* (2013.01); *E05B 2047/0048* (2013.01); *G07C 9/0069* (2013.01)

(58) Field of Classification Search
None
See application file for complete search history.

(56) References Cited

U.S. PATENT DOCUMENTS

| | | | |
|---|---|---|---|
| 4,602,253 A | 7/1986 | Kreft | |
| 4,912,460 A * | 3/1990 | Chu | G07C 9/00658 310/330 |
| 5,893,283 A * | 4/1999 | Evans | E05B 37/00 70/278.7 |

(Continued)

*Primary Examiner* — Robert Cassity
*Assistant Examiner* — Gary Collins
(74) *Attorney, Agent, or Firm* — DeLio, Peterson & Curcio, LLC; Peter W. Peterson

(57) ABSTRACT

An electronic circuit to capture legacy lock controller pulses and reduce the energy consumed. The legacy pulse is captured, converted to power to power the circuit and the direction of the pulse—polarity—is determined. A substitute pulse is created at lower power and sent to a motor actuator in the lock. The total power consumed is substantially reduced by reducing the duration and voltage of the pulse. In the preferred design, the circuit also detects control voltages for solenoid locks and produces suitable control signals for a motor actuator.

19 Claims, 5 Drawing Sheets

(56) References Cited

U.S. PATENT DOCUMENTS

| | | | | |
|---|---|---|---|---|
| 5,896,026 A * | 4/1999 | Higgins | ............ | G07C 9/00896 320/166 |
| 6,006,561 A | 12/1999 | Hill et al. | | |
| 6,108,188 A | 8/2000 | Denison et al. | | |
| 6,333,574 B1 | 12/2001 | Clark et al. | | |
| 6,377,006 B1 * | 4/2002 | Dawson | ............ | G07C 9/00912 318/290 |
| 6,407,483 B1 * | 6/2002 | Nunuparov | ............ | G21H 1/00 310/319 |
| 6,741,160 B1 * | 5/2004 | Dawson | ............ | G07C 9/00666 340/5.2 |
| 8,922,333 B1 * | 12/2014 | Kirkjan | ............ | G07C 9/00309 235/376 |
| 2002/0073753 A1 * | 6/2002 | Miller | ................ | E05B 17/2084 70/278.4 |
| 2002/0167395 A1 * | 11/2002 | Miller | .................... | E05B 37/00 340/5.55 |
| 2004/0246098 A1 | 12/2004 | Denison et al. | | |
| 2005/0168108 A1 * | 8/2005 | Face | ................ | H01H 13/7006 310/330 |
| 2006/0164206 A1 * | 7/2006 | Buckingham | ........... | E05B 47/00 340/5.6 |
| 2006/0281435 A1 * | 12/2006 | Shearer | ............. | G06K 19/0707 455/343.1 |
| 2010/0180649 A1 * | 7/2010 | Harvey | .................. | E05B 37/00 70/277 |
| 2011/0084799 A1 * | 4/2011 | Ficko | ................ | G07C 9/00904 340/5.65 |
| 2012/0280783 A1 * | 11/2012 | Gerhardt | ............ | G07C 9/00309 340/5.6 |
| 2013/0255335 A1 * | 10/2013 | Jonely | ................ | E05B 47/0001 70/277 |
| 2013/0305353 A1 * | 11/2013 | McMillan | ............... | G06F 21/31 726/19 |

\* cited by examiner

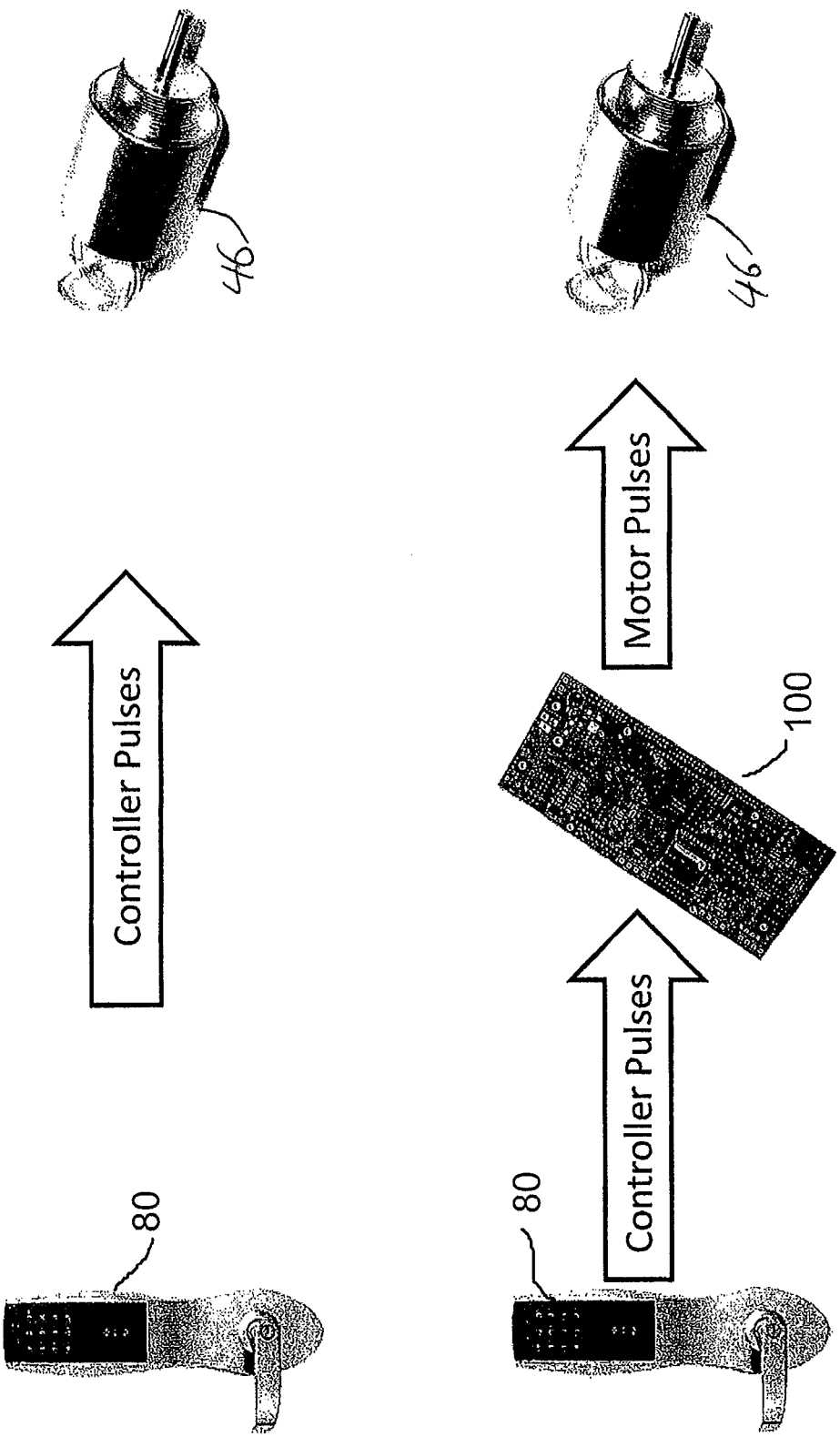

ELECTRONIC CIRCUIT TO CAPTURE LOCK CONTROLLER PULSES

BACKGROUND OF THE INVENTION

1. Field of the Invention

The present invention relates to electronic lock controllers and to improving the energy efficiency of electronic locks.

2. Description of Related Art

One type of electronic lock includes a motor actuator that drives the lock between locked and unlocked states upon receipt of an electronic pulse, referred to herein as a "legacy pulse." A legacy pulse may be of different voltages and durations. Two such standard legacy pulses are 50 milliseconds at 5 volts and 80 milliseconds at 9 volts. A double pulse may be sent by some controllers to ensure proper actuation.

Another type of electronic lock includes a solenoid actuator that is either "fail safe" (defaults unlocked when no power is applied) or "fail secure" (defaults to locked state when no power is applied). Such solenoid actuator electronic locks consume substantial energy when held continuously in the non-default position.

It is desirable to reduce the energy used by the actuators in electronic locks. It is also desirable to improve energy efficiency, reduce cost, and improve quality of electronic locks.

SUMMARY OF THE INVENTION

Bearing in mind the problems and deficiencies of the prior art, it is therefore an object of the present invention to provide a circuit, apparatus and method for improving energy efficiency, reducing cost and/or improving quality of electronic locks.

It is another object of the present invention to provide a circuit, apparatus and method for converting legacy pulses from electronic locks to modified pulses of reduced duration as compared to duration of the legacy pulse.

A further object of the invention is to provide a circuit, apparatus and method for converting legacy pulses from electronic locks to modified pulses of reduced voltage as compared to voltage of the legacy pulse.

It is yet another object of the present invention to provide a circuit, apparatus and method for detecting control voltages for solenoid locks and producing suitable control signals for a motor actuator.

Still other objects and advantages of the invention will in part be obvious and will in part be apparent from the specification.

Bearing in mind the problems and deficiencies of the prior art, it is therefore an object of the present invention to provide an electronic lock controller circuit including an input for receiving a legacy pulse, a power circuit for extracting power from the legacy pulse to power the electronic lock controller circuit, a detector circuit for detecting a polarity of the legacy pulse and a microcontroller having an output for connection to a lock actuator. The microcontroller sends an output pulse via the output to control the lock actuator and the output pulse having reduced power as compared to the legacy pulse at the input.

In another aspect of the invention, there is provided an electronic lock comprising a legacy pulse generator for sending a legacy pulse signal to lock or unlock a door, a lock actuator for driving a lock between locked and unlocked states, and an electronic controller circuit as described above. The microcontroller sends an output pulse via the output to control the lock actuator and the output pulse having reduced power as compared to the legacy pulse at the input.

In a further aspect of the invention, there is provided a method of modifying a legacy pulse signal to control a lock motor actuator in an electronic door lock. The method comprises providing an electronic lock controller circuit as described above; receiving a legacy pulse at the input, using the power circuit to extract power from the legacy pulse to power the electronic lock controller circuit, and using the detector circuit to detecting polarity of the legacy pulse. Thereafter the microcontroller sends an output pulse via the microcontroller output to control the lock actuator, the output pulse having reduced power as compared to the legacy pulse at the input.

The output pulse may have a reduced voltage and/or a reduced duration as compared to the voltage and duration of the legacy pulse at the input.

The electronic lock controller circuit may further include a solenoid input for receiving an off and on solenoid power signal and a power storage circuit for storing power. The microcontroller uses power from the solenoid power signal when the solenoid power signal is on to operate the circuit and the microcontroller using stored power when the solenoid power signal is off to operate the circuit and drive the lock actuator.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 illustrates how a legacy pulse directly drives a lock actuator.

FIG. 5 illustrates how a legacy pulse is intercepted by the electronic circuit of the present invention and creates a modified pulse to drive the lock actuator.

DESCRIPTION OF THE PREFERRED EMBODIMENT(S)

In describing the preferred embodiment of the present invention, reference will be made herein to FIGS. 1-6 of the drawings in which like numerals refer to like features of the invention.

Figure 1:
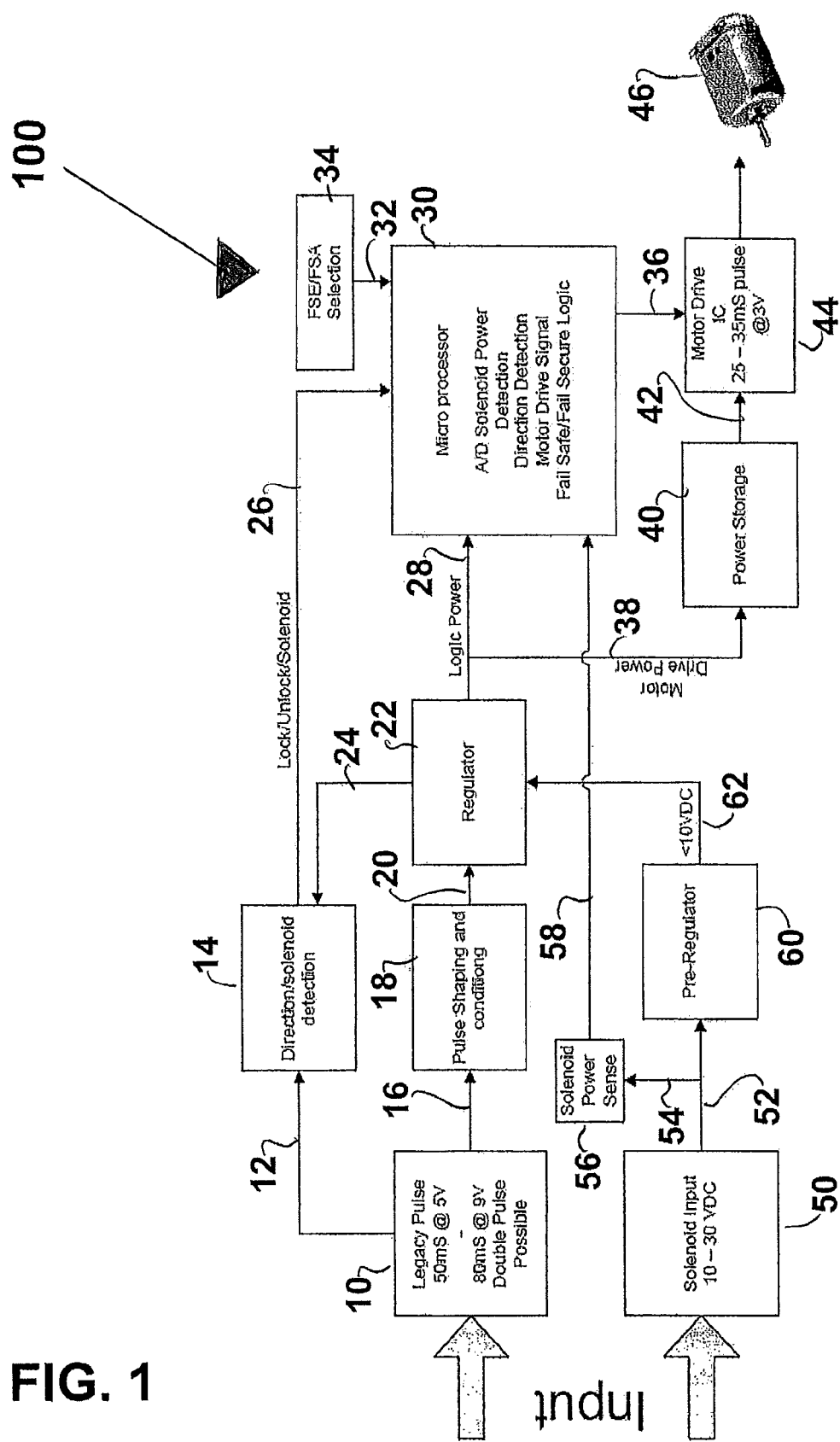
FIG. 1 is a block diagram of an electronic circuit according to the present invention FIG. 2 describes and shows a legacy pulse and how the actuator of an electronic lock responds thereto.

Referring to FIG. 1, a block diagram of operation of an example 100 of the electronic circuit of the present invention, a legacy pulse is received at block 10. Block 10 is an example of a power circuit that extracts power from the legacy pulse of a lock controlling device. The pulse is supplied over connection 12 to circuit block 14, which determines the direction of the pulse, the direction typically being the polarity of the pulse.

The legacy pulse is also provided over connection 16 to circuit block 18, which provides pulse shaping and conditioning. The shaped and conditioned pulse is then supplied over connection 20 to the regulator at block 22. Regulator 22 provides power from the pulse to circuit block 14 and to the microprocessor 30.

In the preferred design, the circuit is capable of detecting not only legacy pulses for motors, but also solenoid power signals via block 50. Block 50 is connected to pre-regulator 60, which reduces the voltage to below a predetermined desired voltage level, here 10 volts DC, and provides that power to regulator block 22 via connection 62.

Regulator block 22 is connected to direction/solenoid detection block 14 and in this way is able to detect the presence of a solenoid type signal at the latter emanating from the lock solenoid signal generator. The direction/solenoid detection circuit block 14 is connected via 26 to the microprocessor circuit block 30. Also, solenoid input at block 50 is connected through connections 52, 54 to solenoid power sense circuit block 56, which is connected to the microprocessor 30 via connection 58.

It will be understood that these connections provide power for the circuit in FIG. 1 from the incoming signals, regardless of whether they are solenoid type continuous signals or are shorter motor drive legacy pulse type signals. Connections 58 and/or 26 signal the microprocessor 30 as to the type of the incoming signal and as to the direction the signal is attempting to actuate the lock actuator. Connection 28 from regulator 22 provides power to the microprocessor 30.

The microprocessor 30 includes analog/digital solenoid power detection, direction detection, and can emulate the operation of a motor driven by a motor legacy pulse or a solenoid driven by a solenoid type power signal. A software or hardware switch allows the microprocessor 30 to emulate either fail safe or fail secure operation.

Because a solenoid actuator typically relies on a spring and the potential energy stored therein to return the lock to the default position, the circuit is provided with power storage circuit 40, which receives power from the regulator 22 over connection 38. When the circuit of FIG. 1 is driven by solenoid power signal 50, power is stored in circuit block 40. When power is removed, the stored power is used through connection 42 and circuit block 44 under microprocessor 30 via control connection 36 to drive the motor actuator 46 to the default position (which may be either locked or unlocked).

It will be understood that in this way, an electronic lock having a lock controller circuit according to FIG. 1 will be compatible with multiple legacy lock controllers, including those that drive motors in two directions (locked and unlocked) as well as those intended to drive a solenoid actuator in a single direction against a default locked or unlocked state. The incoming signal is used to provide power for the circuit and for an efficient motor actuator 46 so that the total power used is substantially reduced.

Moreover, only a single lock mechanism employing the controller circuit of the present invention needs to be held in inventory to meet the needs of the different legacy type external lock control system. This reduces manufacturing and inventory costs as only a single lock needs to be built and held in inventory, and locks in the field can easily be switched to a different type of lock control system.

Although energy is only available during a pulse, by using an efficient circuit and an efficient motor actuator, there is sufficient energy in all types of legacy pulses.

When the legacy pulse arrives, the circuit wakes up and initializes. It then detects the pulse orientation/direction and drives the motor actuator 46. It then returns to sleep prior to input pulse termination.

Another advantage of the present circuit is that some controllers are designed to double pulse motors (to ensure they are locked). The circuit of FIG. 1 ignores double pulses.

The electronic circuit 100 of FIG. 1 also operates at a lower voltage than legacy input pulses of all types. Preferably, it operates at 3 volts. This reduces the total energy consumed, which over time adds up to a significant reduction in total energy consumed. Thus, this circuit is suitable for both battery powered lock systems and hardwired lock systems.

Because legacy pulses are typically at least 50 milliseconds in duration or longer, the circuit operates over a total period of time of 50 ms or less.

Figure 2:
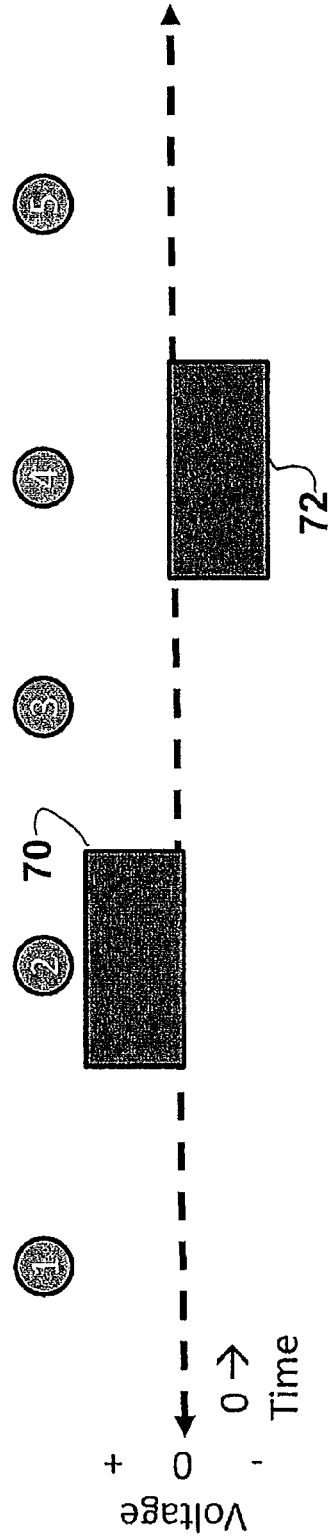

Although the preferred design will accept solenoid pulses and respond accordingly, the present invention is also directed to designs that only respond to legacy motor pulses:

FIG. 2 shows a typical lock and unlock pulse cycle for a legacy pulse where time period 1 represents the time the door is in the locked state, time period 2 shows the time for unlock pulse 70, and time period 3 represents the unlock dwell time during the time that the door is unlocked, typically 6 seconds. Time period 4 represents the time for relock pulse 72 of polarity opposite unlock pulse 70, and time period 5 represents the time that the door is in the locked state (and which then continues back to time period 1). As shown in the example of FIG. 2, one polarity pulse 70, typically of about 50 to 80 milliseconds, 0.2 amps and 5 to 9 volts, drives the lock actuator motor in one direction to unlock the door lock and an opposite polarity pulse 72, typically of about 50 to 80 milliseconds, 0.2 amps and 5 to 9 volts, drives the lock actuator motor in the opposite direction to relock the door. The energy consumed per pulse in this example is about 50 to 144 milliwatts.

Figure 3:
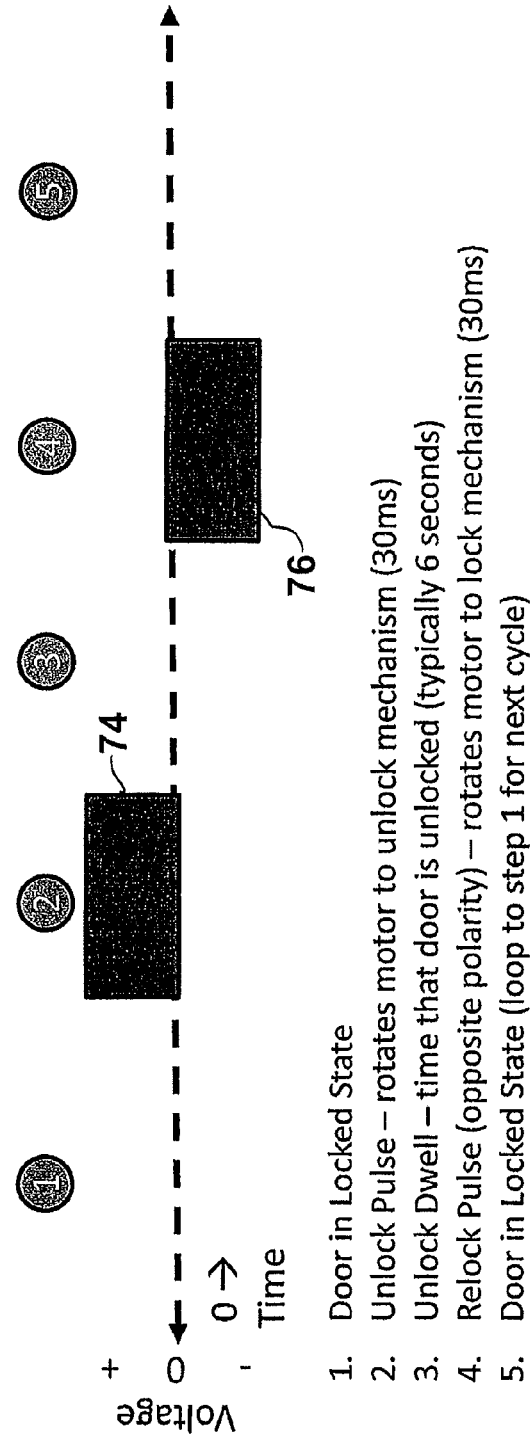
FIG. 3 describes and shows a pulse created by the electronic circuit of the present invention how the actuator of an electronic lock responds thereto.

FIG. 3 shows a lock and unlock pulse cycle for the electronic circuit of the present invention depicted in FIG. 1. In this example time period 1 represents the time the door is in the locked state, time period 2 shows the time for unlock pulse 74, and time period 3 represents the unlock dwell time during the time that the door is unlocked, typically 6 seconds. Time period 4 represents the time for relock pulse 76 of polarity opposite unlock pulse 74, and time period 5 represents the time that the door is in the locked state (and which then continues back to time period 1). As shown in the example of FIG. 3, positive polarity pulse 74 drives the lock actuator motor to unlock the door lock and an opposite polarity pulse 76 drives the lock actuator motor in the opposite direction to relock the door. However, these pulses are typically only 30 milliseconds in duration instead of 50 to 80 milliseconds in duration for the prior art legacy pulses. Although they are of the same current—0.2 amps, the voltage is significantly less than that of the legacy pulses, and is reduced to only 3 volts as compared to the 5 to 9 volts of the legacy pulses. Thus, the energy consumed per pulse in this example is significantly less—only 18 milliwatts instead of 50 to 144 milliwatts in the legacy pulse case. The energy reduction is even greater for solenoid locks.

FIG. 4 shows the configuration of how an input from a pulse generated by electronic lock 80 of the legacy design causes the legacy pulse to directly drive lock motor actuator 46. FIG. 5 shows the configuration of how the electronic circuit 100 of the present invention intercepts the legacy pulse generated from lock 80, modifies that pulse to a lower voltage and pulse duration, and then sends the modified pulse to the lock motor actuator 46. Electronic lock 80 may include a solenoid power signal generator, in which case the circuit 100 operates in accordance with the description for receiving solenoid input in the circuit of FIG. 1. Electronic circuit 100 may be incorporated into the door lock 80 to control actuator 46.

Figure 6:
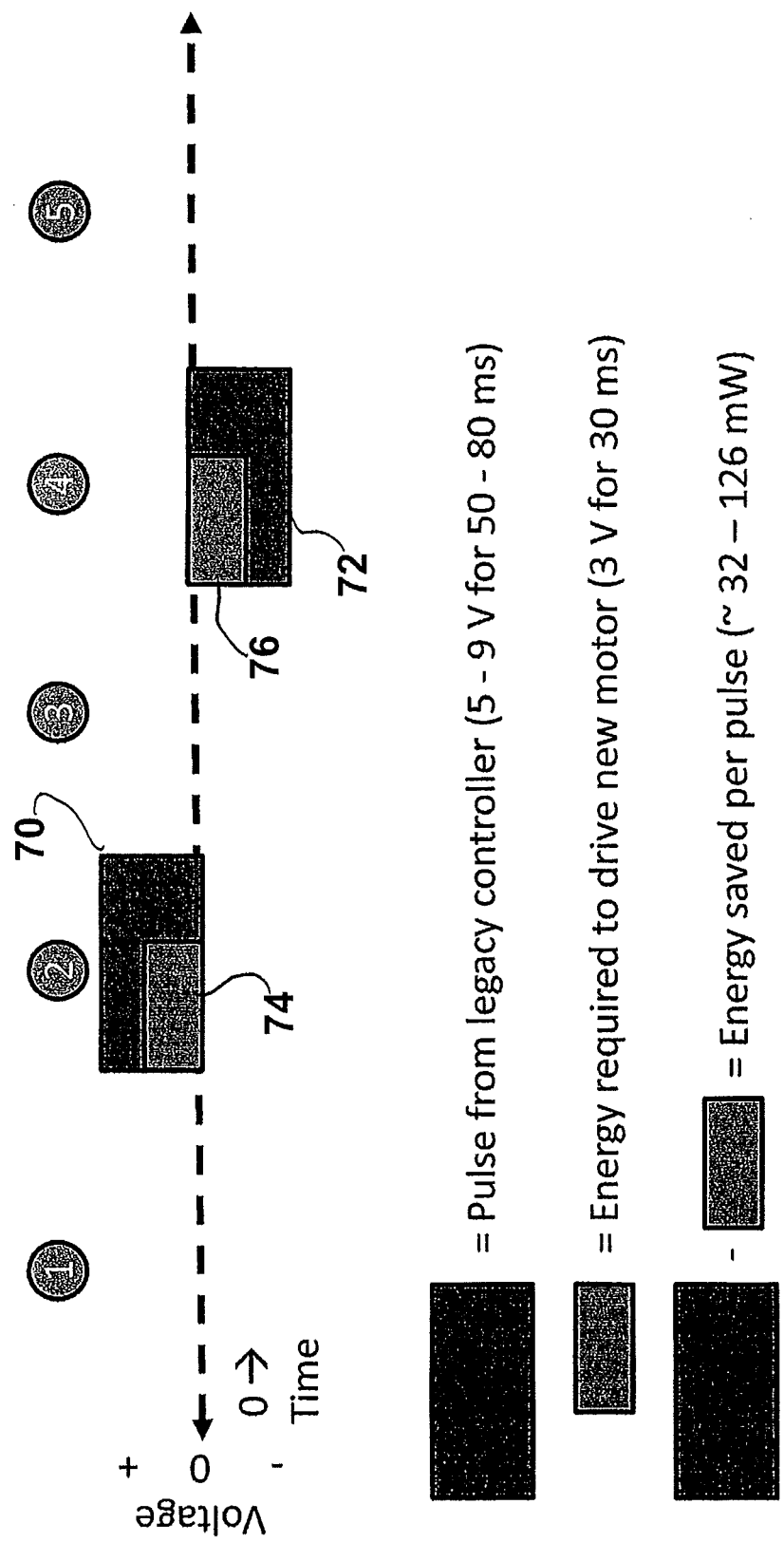
FIG. 6 illustrates how energy is saved with the pulses created by the electronic circuit of the present invention.

FIG. 6 provides a more detailed graphical representation of the operation and energy savings achieved with the electronic circuit of the present invention. The time periods and pulses of the legacy pulses and modified pulses of the present invention of FIGS. 2 and 3, respectively, are overlaid and compared. In each instance, the modified unlock and relock pulses 74, 76 of the present invention are of lower voltage and shorter time duration than the unlock and relock legacy pulses 70, 72, respectively. This results in energy savings in each pulse, and less total energy required to drive the lock motor actuator 46.

The present invention therefore achieves one or more of the objects described above. The present invention provides an electronic circuit to capture legacy lock controller pulses and reduce the energy consumed. The legacy pulse is captured, converted to power to power the circuit and the direction of the pulse—polarity—is determined. A substitute pulse is created at lower power and sent to a motor actuator in the lock. The substitute pulse has a reduced duration and/or a reduced voltage as compared to a duration and voltage of the legacy pulse. The total power consumed is substantially reduced by reducing the duration and voltage of the pulse. In the preferred design, the circuit also detects control voltages for solenoid locks and produces suitable control signals for a motor actuator.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An electronic lock controller circuit comprising:
 an input for receiving a legacy pulse, the legacy pulse signaling to lock or unlock a door;
 a power circuit for extracting power from the legacy pulse to power the electronic lock controller circuit;
 a detector circuit for detecting a polarity of the legacy pulse;
 a microcontroller having an output for connection to a lock actuator, the microcontroller sending an output pulse via the output to control the lock actuator and the output pulse having reduced power as compared to the legacy pulse at the input;
 a power storage circuit for storing power; and
 a solenoid input for receiving an off and on solenoid power signal, the microcontroller using power from the solenoid power signal when the solenoid power signal is on to operate the circuit and the microcontroller using stored power when the solenoid power signal is off to operate the circuit and drive the lock actuator.

2. The electronic lock controller circuit according to claim 1 wherein the output pulse has a reduced voltage as compared to a voltage of the legacy pulse at the input.

3. The electronic lock controller circuit according to claim 1 wherein the output pulse has a reduced duration as compared to a duration of the legacy pulse at the input.

4. The electronic lock controller circuit according to claim 1 wherein the output pulse has a reduced duration and a reduced voltage as compared to a duration and voltage of the legacy pulse at the input.

5. The electronic lock controller circuit according to claim 1 wherein the microcontroller is powered solely by power from the legacy pulse extracted by the power circuit.

6. The electronic lock controller circuit according to claim 5 wherein the microcontroller sends a single output pulse via the output to control the lock actuator in response to a single legacy pulse at the input.

7. An electronic lock comprising:
 a legacy pulse generator for sending a legacy pulse signal to lock or unlock a door;
 a lock actuator for driving a lock between locked and unlocked states; and
 an electronic controller circuit having an input for receiving the legacy pulse, a power circuit for extracting power from the legacy pulse to power the electronic lock controller circuit, a detector circuit for detecting a polarity of the legacy pulse, a power storage circuit for storing power, a solenoid input for receiving an off and on solenoid power signal;
 and a microcontroller having an output connected to the lock actuator,
  the microcontroller sending an output pulse via the output to control the lock actuator the output pulse having reduced power as compared to the legacy pulse at the input,
 the microcontroller using power from the solenoid power signal when the solenoid power signal is on to operate the circuit and the microcontroller using stored power when the solenoid power signal is off to operate the circuit and drive the lock actuator.

8. The electronic lock according to claim 7 wherein the output pulse has a reduced voltage as compared to a voltage of the legacy pulse at the input.

9. The electronic lock according to claim 7 wherein the output pulse has a reduced duration as compared to a duration of the legacy pulse at the input.

10. The electronic lock according to claim 7 wherein the output pulse has a reduced duration and a reduced voltage as compared to a duration and voltage of the legacy pulse at the input.

11. The electronic lock according to claim 7 further including:
 a solenoid power signal generator,
 wherein the solenoid input is configured for receiving the off and on solenoid power signal from the solenoid power signal generator.

12. The electronic lock according to claim 7 wherein the microcontroller is powered solely by power from the legacy pulse extracted by the power circuit.

13. The electronic lock according to claim 12 wherein the microcontroller sends a single output pulse via the output to control the lock actuator in response to a single legacy pulse at the input.

14. A method of modifying a legacy pulse signal to control a lock motor actuator in an electronic door lock comprising:
 providing an electronic lock controller circuit according to claim 1;
 receiving a legacy pulse at the input, the legacy pulse signaling to lock or unlock a door;
 using the power circuit to extract power from the legacy pulse to power the electronic lock controller circuit;

using the detector circuit to detecting polarity of the legacy pulse; and using the microcontroller to send an output pulse via the microcontroller output to control the lock actuator, the output pulse having reduced power as compared to the legacy pulse at the input, the microcontroller using power from the solenoid power signal when the solenoid power signal is on to operate the circuit and the microcontroller using stored power when the solenoid power signal is off to operate the circuit and drive the lock actuator.

15. The method according to claim 14 wherein the output pulse has a reduced voltage as compared to a voltage of the legacy pulse at the input.

16. The method according to claim 14 wherein the output pulse has a reduced duration as compared to a duration of the legacy pulse at the input.

17. The method according to claim 14 wherein the output pulse has a reduced duration and a reduced voltage as compared to a duration and voltage of the legacy pulse at the input.

18. The method according to claim 14 wherein the microcontroller is powered solely by power from the legacy pulse extracted by the power circuit.

19. The method according to claim 18 wherein the microcontroller sends a single output pulse via the output to control the lock actuator in response to a single legacy pulse at the input.

* * * * *